United States Patent [19]
Martin

[11] Patent Number: 5,567,101
[45] Date of Patent: Oct. 22, 1996

[54] LOCK-IN GRIP ARM SHANK NAIL

[76] Inventor: Donald A. Martin, 1411 N. Dugdale Rd., North Chicago, Ill. 60064

[21] Appl. No.: 505,064

[22] Filed: Jul. 21, 1995

Related U.S. Application Data

[63] Continuation-in-part of Ser. No. 602,429, Oct. 23, 1990, abandoned.

[51] Int. Cl.⁶ .............................. F16B 15/00; F16B 15/06
[52] U.S. Cl. ..................... 411/447; 411/456; 411/510; 411/922
[58] Field of Search .................... 411/447, 456, 411/450, 451, 494, 508, 509, 510, 922

[56] References Cited

U.S. PATENT DOCUMENTS

| | | | |
|---|---|---|---|
| 838,203 | 12/1906 | Neil | 411/447 |
| 875,779 | 1/1908 | Clover | 411/456 |
| 1,631,044 | 5/1927 | Lytton | 411/922 X |
| 2,614,450 | 10/1952 | Oltz et al. | 411/922 X |
| 2,618,297 | 11/1952 | Gosselin | 411/922 X |
| 3,290,983 | 12/1966 | Peterson | 411/922 X |
| 3,894,467 | 7/1975 | Brescia | 411/922 X |

Primary Examiner—Neill R. Wilson
Attorney, Agent, or Firm—Mathew R. P. Perrone, Jr.

[57] ABSTRACT

A lock-in grip arm shank nail provides holding power. The nail has a shank between a head for driving the and a point to penetrate the surface. The shank includes at least one set of apertures parallel to the head and capable of receiving a u-shaped wire. The u-shaped wire has its base in the aperture and arms extending on either side of the shank toward the head of the nail. The arms have a rounded tip and may include a wave shape.

8 Claims, 3 Drawing Sheets

LOCK-IN GRIP ARM SHANK NAIL

CROSS REFERENCE TO RELATED APPLICATION

This application is a continuation-in-part of Ser. No. 07/602,429, filed Oct. 23, 1990, by Donald A. Martin, now abandoned, this application and the parent application having the same inventive entity.

This invention relates to a nail, and more particularly to a nail having improved fastening capabilities due to at least one wire inserted through an aperture in the shank of the nail.

BACKGROUND OF THE INVENTION

It is desirable for a nail to hold into the surface, which it is desired to join to another item. Generally speaking, a nail is driven through one surface into another surface in order to hold both the object having the first surface adjacent to the object having the second surface. A nail, by its very nature, does not hold well for all purposes.

It is desired to increase the holding power of the nail without increasing the difficulty of driving the nail. The prior art includes a number of options for accomplishing this increased holding power. However, where the prior art increases the gripping capability, it either increases the damage to the wood as the nail is being driven or makes the nail harder to drive.

It is desired to increase the gripping capability of the nail without causing these adverse effects. These conflicting requirements seem very difficult in that the desired results are contradictory. If a nail can be designed to overcome this problem, a great advantage can be obtained.

In the prior art, the specific uses of the uniformed round cross section, for any of the U-shaped grip arms are never listed. The listings of the increased fastening, or gripping powers of a round cross-section, over a triangular knife-like cross section within the U-shaped grip arms of the prior arts are never mentioned.

The round cross-section is absent from any knife-like edges. The nails of the prior art have the long knife-like edges for their plain, flat, and lifeless; and U-shaped grip arm branch members within their knife-like triangular cross-section. This structure gouges-out the nail hole wood larger than the intended nail shank, as the prior art shank is twisted to coil the prior art grip arms around the shank.

Twisting of the grip arms within the nails of the prior art can do additional wood gouging. The terminal-ends of the branch arm members within the grip arms are pointed as each rests against the nail hole wood. As the shank is twisting to coil the grip arms around the shank, the tearing of the wood takes place.

The nails of the prior art will twist the nail shank, thereby coiling, or spiralling the grip arms around the nail shank, and then gouging-out the wooden nail hole. It is desired to avoid this destruction of the wood, while still having the desired holding power.

SUMMARY OF THE INVENTION

Among the many objectives of this invention is the provision of a lock-in grip arm shank nail having a U-shaped member with a flat rounded end to improve holding power.

A further objective of this invention is the provision of a lock-in grip arm shank nail, lacking a wood gouging problem.

A still further objective of this invention is the provision of a lock-in grip arm shank nail, which can be easily driven into a surface.

Yet a further objective of this invention is the provision of a lock-in grip arm shank nail, which can avoid twisting of the nail.

These and other objectives of the invention (which other objectives become clear by consideration of the specification, claims and drawings as a whole) are met by providing a lock-in grip arm shank nail, the nail having a shank between a head for driving the nail and a point to penetrate the surface. The shank includes at least one set of apertures parallel to the head and capable of receiving a U-shaped wire. The U-shaped wire has its base in the aperture and arms extending on either side of the shank. The arms have a rounded tip and may include a wave shape.

BRIEF DESCRIPTION OF THE DRAWINGS

FIG. 5 depicts a top cross-section of FIG. 3 along Section Line 5—5.

Throughout the figures of the drawings, where the same part appears in more than one figure of the drawings, the same number is applied thereto.

DESCRIPTION OF THE PREFERRED EMBODIMENTS

Figure 1:
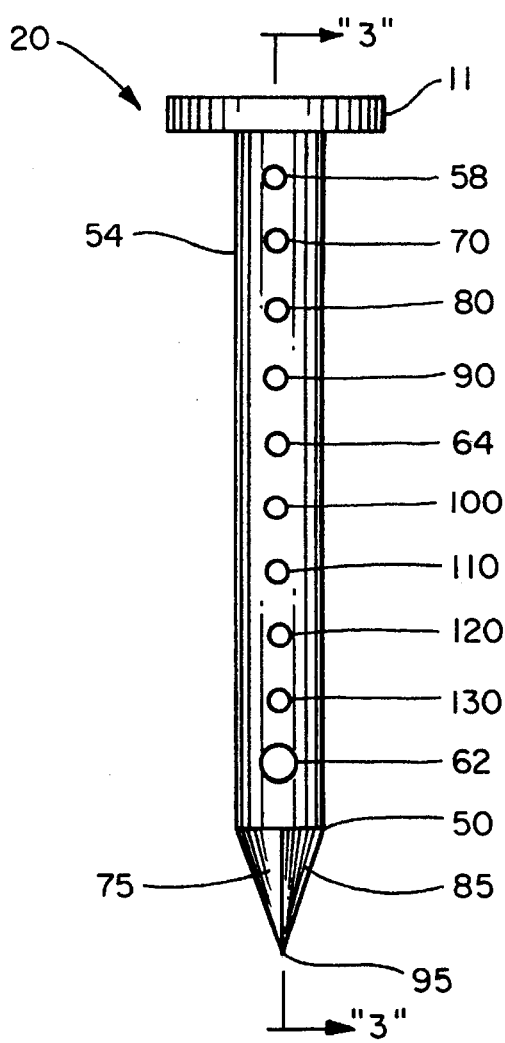
FIG. 1 depicts a side view of lock-in grip arm shank nail of this invention in the form of shank hole nail 20.

A lock-in grip arm shank nail includes a head, a point, and a shank. The shank includes at least one set of shank holes. Through the shank holes may be inserted U-shaped grip arms having a wave configuration. The U-shaped grip arms provide extra holding power so as to the lock nail fastener in position as it is driven into the wood. The shank holes in the shank of the nail are spaced apart. There is a first set of shank holes on one side of the nail.

Additionally, a second set of shank holes may alternate with the first set of shank holes or apertures. Usually, the first set of shank holes has an axis of up to about 90 degrees with the second set of shank holes. The axis can, of course, vary from the 90 degrees as desired. In this way, two opposing grip arm members can be used to hold the nail in position.

This invention has the terminally flat, and round blunt-ends upon the wave formed U-shaped grip arm branch members within the wave formed U-shaped grip arm. This grip arm is attached through alternating shank holes within the round shank by the wave formed U-shaped grip arm base members inserted into the alternating shank holes within the round shank. In this manner, the grip arm prevents any wood scraping, or wood gouging by these terminally flat, and round blunt-ends.

These blunt ends off of the wave formed U-shaped grip arms of this invention avoid tearing of the wood. These wave formed U-shaped grip arms are never twisted around the shank of this fastener in order to achieve the desired holding. This fastener with the wave formed U-shaped grip arms drives a straight-line course into the wood, and the wave formed U-shaped grip arms of this invention are not twisted around the shank. Therefore wood gouging is not caused by this fastener, due to the lack of any knife-like edges from a triangular cross-section used within a grip arm by a prior art nail.

This invention is within the special type of nail art, for which the nail driven can be used in fastening soft, or hard material together. For example, this nail can be driven into the soft end grain at the end of the wooden board. The u-shaped member has two serpentine and elongated arms. The arms are oppositely disposed, resilient, and triangulated wave formed as branch arm members within the U-shaped grip arm.

These arms are attached to a base, and extend from the alternating shank holes, off from the wave formed U-shaped grip arm base member ends. That is to say, the transverse base member is anchored through the set of alternating shank holes within the shank. This fastener will lock into the soft end grain at the end of a wooden board when the triangulated, and resilient wave forms within the U-shaped grip arms are pulled into the material by the attached shank. The depressed wave forms, off of the U-shaped grip arm branch members, tend to return as their original wave forms.

This invention has the terminally flat, and round blunt-ends upon the wave formed U-shaped grip arm branch members within the wave formed U-shaped grip arm, attached through the alternating shank holes within the round shank. The wave formed U-shaped grip arm base members are inserted into the alternating shank holes within the round shank, preventing any wood scraping, or wood gouging by these terminally flat, and round blunt-ends. The blunt ends are the two termination points off of the wave formed U-shaped grip arms of this invention. These wave formed U-shaped grip arms are never twisted around the shank of this fastener.

This fastener can additionally be used, for joining dried-out wood together. Usually with any fastener that has been driven into any dry wood, the dry wood does not tend to grab onto the fastener as tight as wood that has the new moisture remaining within the wooden grain. Therefore, a fastener is needed, that performs to fill in the dry wooden spaces, that are made in the wood because of the dryness of the material.

To reemphasize, this fastener has the serpentine, and elongated, triangulated, and resilient wave formed U-shaped grip arms. Those arms, as the resilient, and triangulated wave forms are depressed into the dry wood, between the material, and the nail shank provide holding power. The triangulated, and resilient wave forms insist on tending to return as their original wave forms to lock the fastener into the dry wood.

This fastener is extending its capacity from the standard shank nail of this invention. The longest nail shank of this invention has sufficient length to extend this nail shank beyond the backside surface of the material with sufficient shank length clearance. The shank length clearance allows one triangulated, and resilient wave form frame, off of each one U-shaped grip arm branch member to open, and to remain originally in the opened position.

This, in turn, serves to hook and to lock the two, oppositely disposed of opened resilient wave forms, anchored by the base members through the first alternating transverse shank hole, directly above the round nail point base, onto and against the backside surface of the material. Therefore the concurrently remaining triangulated, and resilient wave forms, attached, and extending from the single triangulated wave form, open to hook against the backside surface of the material. Each wave formed U-shaped grip arm branch member is depressed up in between the material, and the longest nail shank of this invention.

The complete nail fastener is locked into the material by the insisting tendency of the resilient, and triangulated wave forms, tending to return as their original wave forms within the wave formed U-shaped grip arm. This type of fastener is utilized, for a roofing nail with a large round head, nailing shingles onto roofs, and attachments onto wall boards.

This nail can be used to fasten normally new boards to wooden frames, for buildings, whereas when the boards tend to loosen because the dryness has taken over the wooden structure. The resilient, and the triangulated wave formed U-shape grip arms fit the wave forms into the dry gaps within the dry wood, as the insisting resilient, and triangulated wave forms tend to return as their original wave forms within the wood. The U-shaped grip arm branch members are attached to, and extending from the alternating round nail shank holes within the nail shank, locking the fastener into the wooden structure.

This invention is a locking nail fastener comprising, a round shank with a nail point, and a nail head at the opposite end, and a locking means comprising, one, or more alternating wave formed U-shaped grip arms, attached to, and extending from one, or more alternating shank holes within the round shank as two, oppositely disposed of elongated, and triangulated wave formed branch arm members within each U-shaped grip arm, and U-shaped from the two, oppositely disposed of parallel, and perpendicular wave formed branch arm members, attached to, and extended from the two, oppositely disposed of U-shaped grip arm base member ends, upon the transverse base member.

Figure 3:
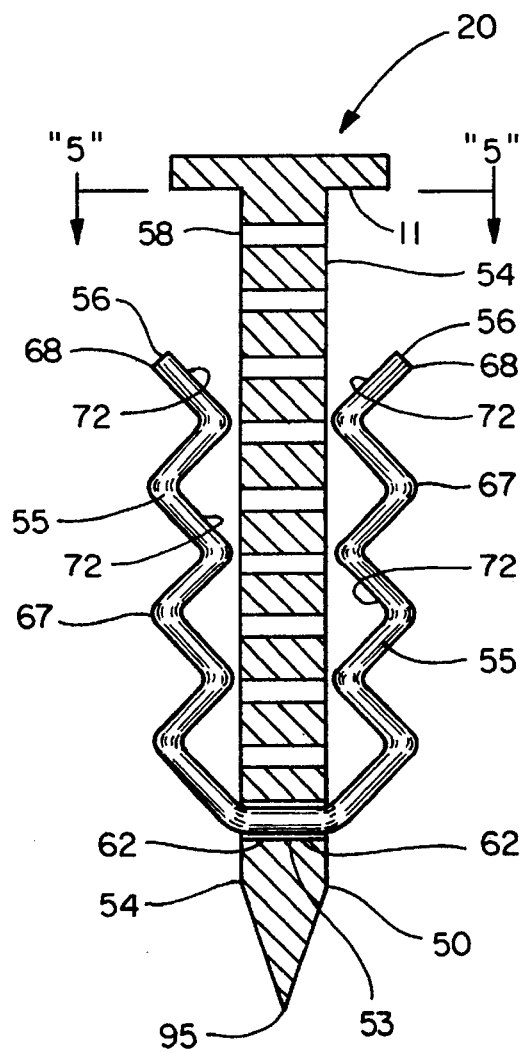
FIG. 3 depicts a side view of FIG. 1 rotated 90 degrees about a vertical axis lock with U-shaped grip arm base member tip 46 in position in nail 20 of FIG. 1.

Referring now to FIG. 1 and FIG. 3, a side view of the nail 20 is depicted. The nail 20 includes a head 11 and a point 95. The shank 54 is between the nail head 11 and the point 95. The shank 54 includes a plurality of apertures in the shank 54. The shank 54 includes, as depicted, ten apertures numbered respectively, from 58, 70, 80, 90, 64, 100, 110, 120, 130, and 62. The shank end adjacent to the point terminates at shank end 50.

Figure 2:
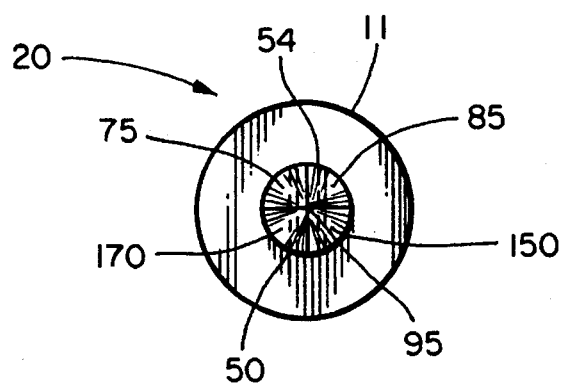
FIG. 2 depicts an end plan view of FIG. 1 showing round nail point base 50.
Figure 6:
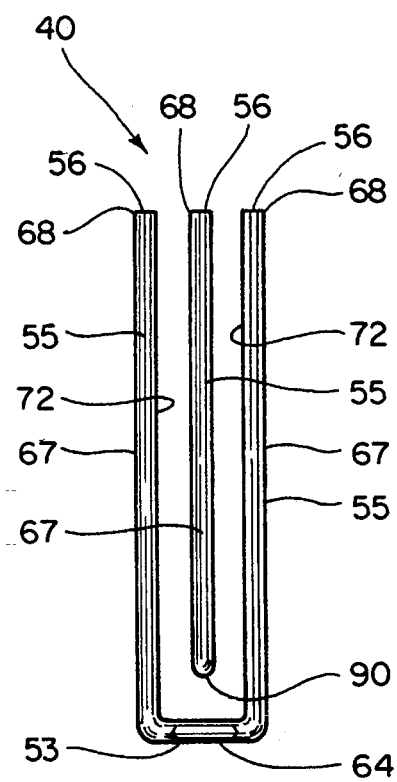
FIG. 6 depicts a side view of U-shaped grip arm base member 53 inserted in shank hole 64 and shank hole 90.

The point includes four nail point facets as shown in FIG. 2. First nail point facet 75 is oppositely disposed from nail point facet 150. Second nail point facet 85 is oppositely disposed from fourth nail point facet 170. This structure is clarified by FIG. 1 and FIG. 3. By considering FIG. 4 and FIG. 6, U-shaped grip arm members 55 may be crossed and inserted in alternating shank holes.

Figure 8:
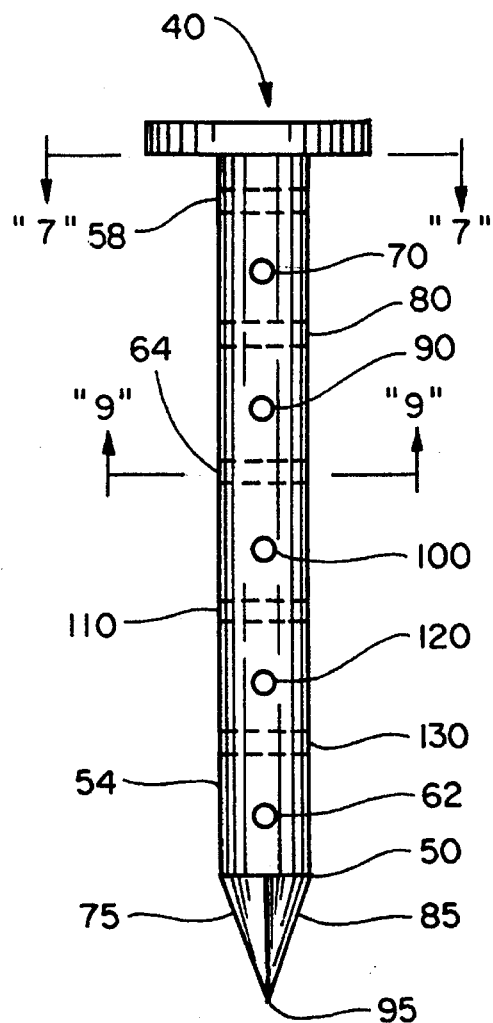
FIG. 8 depicts a side view of lock-in grip arm shank nail of this invention in the form of transverse shank hole nail 40.
Figure 7:
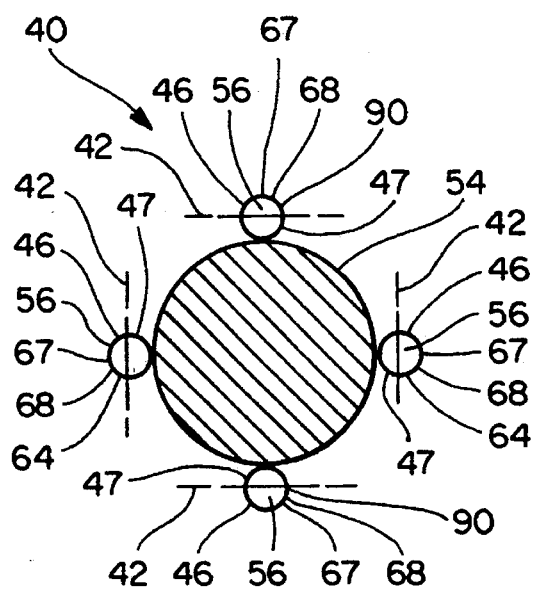

The alternating shank holes can best be depicted in a different version in FIG. 8 wherein shank hole 58 is shown having a perpendicular axis to shank hole 70. Shank hole 80 is shown as having a perpendicular axis to shank hole 90. Shank hole 64 is shown as having a perpendicular axis to shank hole 100. Likewise, shank hole 110 is shown as being perpendicular to shank hole 120 with shank hole 130 being perpendicular to shank hole 62. Thus, shank holes 62, 120, 100, 90 and 70 are parallel. Shank holes 58, 80, 64, 110 and 130 are parallel and at an angle with the first set of shank holes.

In FIG. 3, the U-shaped grip arm 55 includes a wave form. The wave form is basically transverse having a series of adjacent points 72 close to the nail. It also has a series of points 67 oppositely disposed from adjacent points 72. These two points 67 and 72 provide a wave form that permit the U-shaped member 55 to grip the nail shank 54 into the wood (not shown).

In FIG. 2, an end view of the nail from the point is depicted. Head 11 extends beyond the point. The point 54 includes the opposing facets 75, 150, 170 and 85. The nail point 95 is the point that works best with the nail 20 or 40 of this invention.

In FIG. 3, the U-shaped insert with the wave shape is shown. Having the waves achieves the desired result of the gripping capability. As the U-shaped insert is driven in, raised point 67 and arms 55 flatten out alongside the nail. As effort is made to remove the point, the grip arm 55 and the round blunt end 68 and 56 grip and lock into the wood. The U-shaped member includes a base 53 and wave arms 55 extending upwards therefrom. The waves defined by the 72 and 67 lock the U-shaped member in position.

Figure 4:
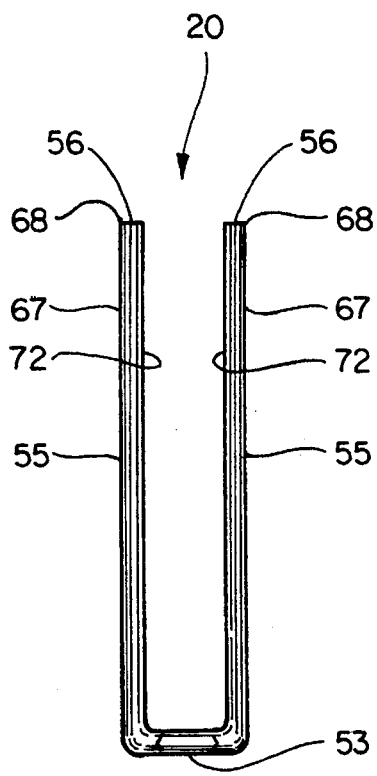
FIG. 4 depicts a side view of U-shaped grip arm base member 53 in nail 40 of FIG. 3.

Considering now FIG. 4, the U-shaped member is depicted. Obviously, this U-shaped member has base 53 and with the wave at 72 has the gripping capability of the instant matter.

Figure 7:
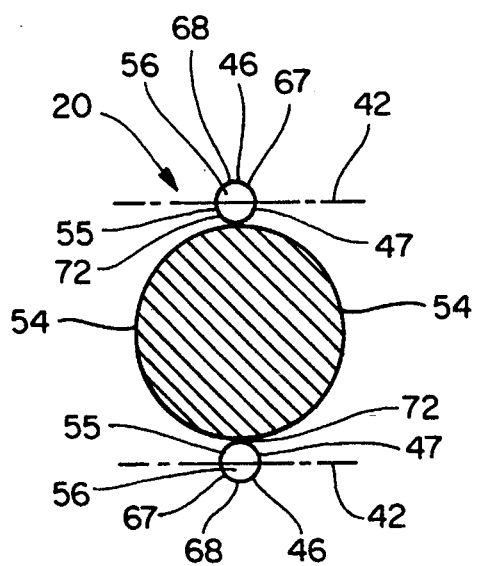
FIG. 7 depicts a top cross-section of FIG. 8 along Section Line 7—7, with U-shaped grip arm base member ends 53 inserted in shank hole 64 and shank hole 90.
Figure 9:
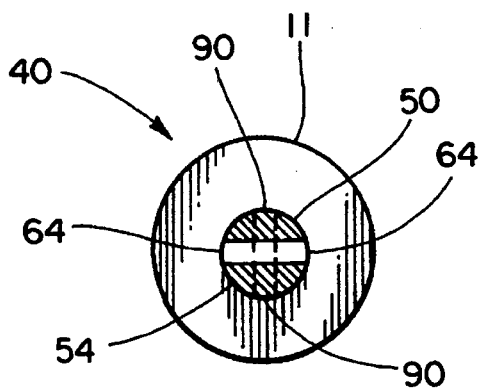
FIG. 9 depicts a top cross-section of FIG. 8 along Section Line 9—9.

Basically the nail 20 in the form of parallel shank hole nail 20 includes a nail head 11 and a round nail point base 50. Between the nail head 11 and the round nail point base 50 is shank 54. The rotated shank hole nail 40 of FIG. 7, FIG. 8 and FIG. 9 is similar to parallel shank hole nail 20.

The nail hole head 11 is present along with the shank 54 and the nail point 95. The difference is in the shank holes. The U-shaped shank hole members include member base ends 53 or U-shaped grip base member tips 46. These branch members 55 extend along parallel sides of shank 54. The diameter of shank 54 separates the U-shaped grip arm branch members 55. The shank holes may be arranged appropriately as it is desired to position the U-shaped members.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A locking nail fastener comprising a shank, a point, and a head, the locking nail fastener further comprising:
   (a) the shank being centrally located on the locking nail fastener with the head at one end thereof and the point at an oppositely disposed end thereof;
   (b) the shank further including a locking means for securing the nail in a position after the nail is driven into a surface;
   (c) the locking means including a plurality of apertures in the shank and a locking clip inserted through at least one aperture in the locking apertures;
   (d) the series of apertures being divided into a first set of apertures and a second set of apertures;
   (e) the first set of apertures having mutually parallel axes;
   (f) the second set of apertures having mutually parallel axes; and
   (g) the first set of apertures and the second set of apertures being at an angle in relation to each other.

2. The locking nail fastener of claim 1, further comprising:
   (a) the locking means being a u-shaped member slidably mounted in one of the apertures;
   (b) the u-shaped member having a base fitting in the one of the apertures, a first arm extending along a first side of the shank and a second arm extending along a second side of the shank; and
   (c) the first side of the shank being oppositely disposed from the second side of the shank.

3. The locking nail fastener of claim 2, further comprising:
   (a) the locking means further including a first u-shaped member and a second u-shaped member slidably mounted in one of the second apertures;
   (b) the first u-shaped member being slidably mounted in one of the first set of apertures; and
   (c) the second u-shaped member being slidably mounted in one of the second set of apertures.

4. The locking nail fastener of claim 3, further comprising:
   (a) the first u-shaped member having a shape similar to the second u-shaped member;
   (b) the first u-shaped member having the base fitting in the one of the first set of apertures, the first arm extending along a first side of the shank and the second arm extending along a second side of the shank; and
   (c) the first arm and the second arm having a wave shape.

5. The locking nail fastener of claim 4, further comprising:
   (a) the first set of apertures having a first set of axes contained in a first plane;
   (b) the second set of apertures having a second set of axes contained in a second plane;
   (c) the first plane forming an angle with the second plane of up to 90 degrees.

6. The locking nail fastener of claim 5, further comprising the point having four facets.

7. The locking nail fastener of claim 1 further comprising:
   (a) the locking means being a u-shaped member slidable mounted in one of the apertures;
   (b) the u-shaped member having a base fitting in the one of the apertures, a first arm extending along a first side of the shank and a second arm extending along a second side of the shank;
   (c) the first side of the shank being oppositely disposed from the second side of the shank; and
   (d) the first arm and the second arm having a wave shape.

8. The locking nail fastener of claim 7, further comprising the point having four facets.

* * * * *